April 5, 1966    A. DER TATEVASIAN    3,244,981
AUTOMOBILE TRANSISTOR RADIO HOLDER
Filed June 13, 1963    2 Sheets-Sheet 1
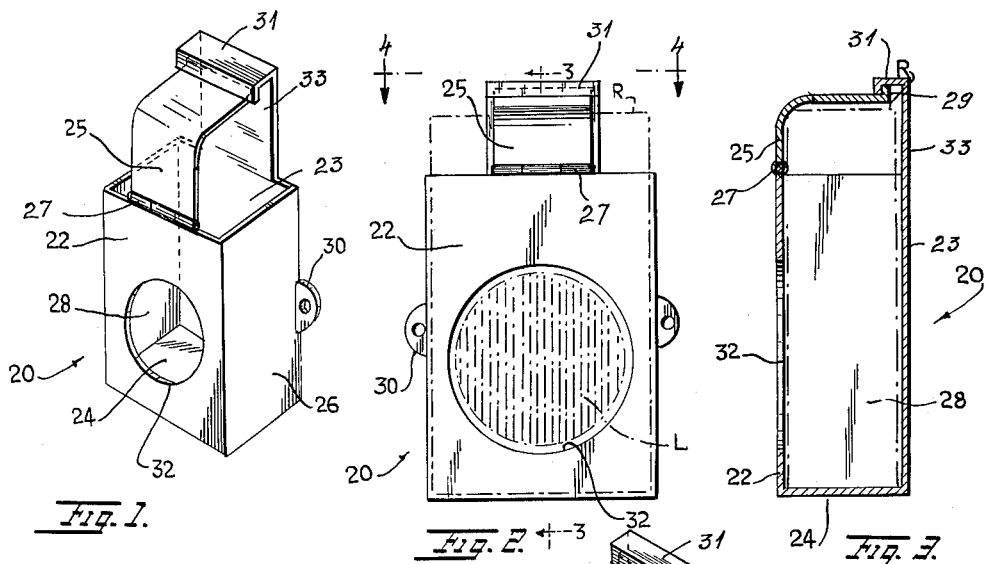
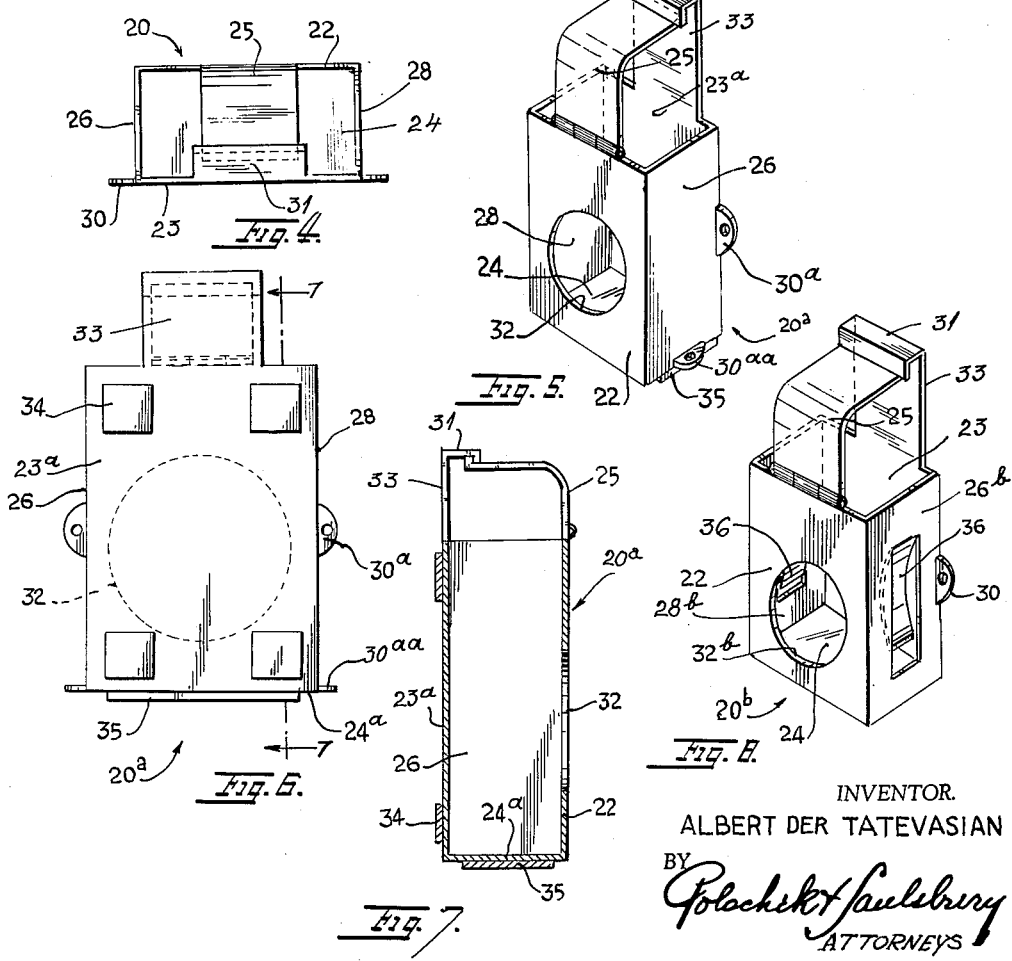
INVENTOR.
ALBERT DER TATEVASIAN
BY Polochek & Saulsbury
ATTORNEYS

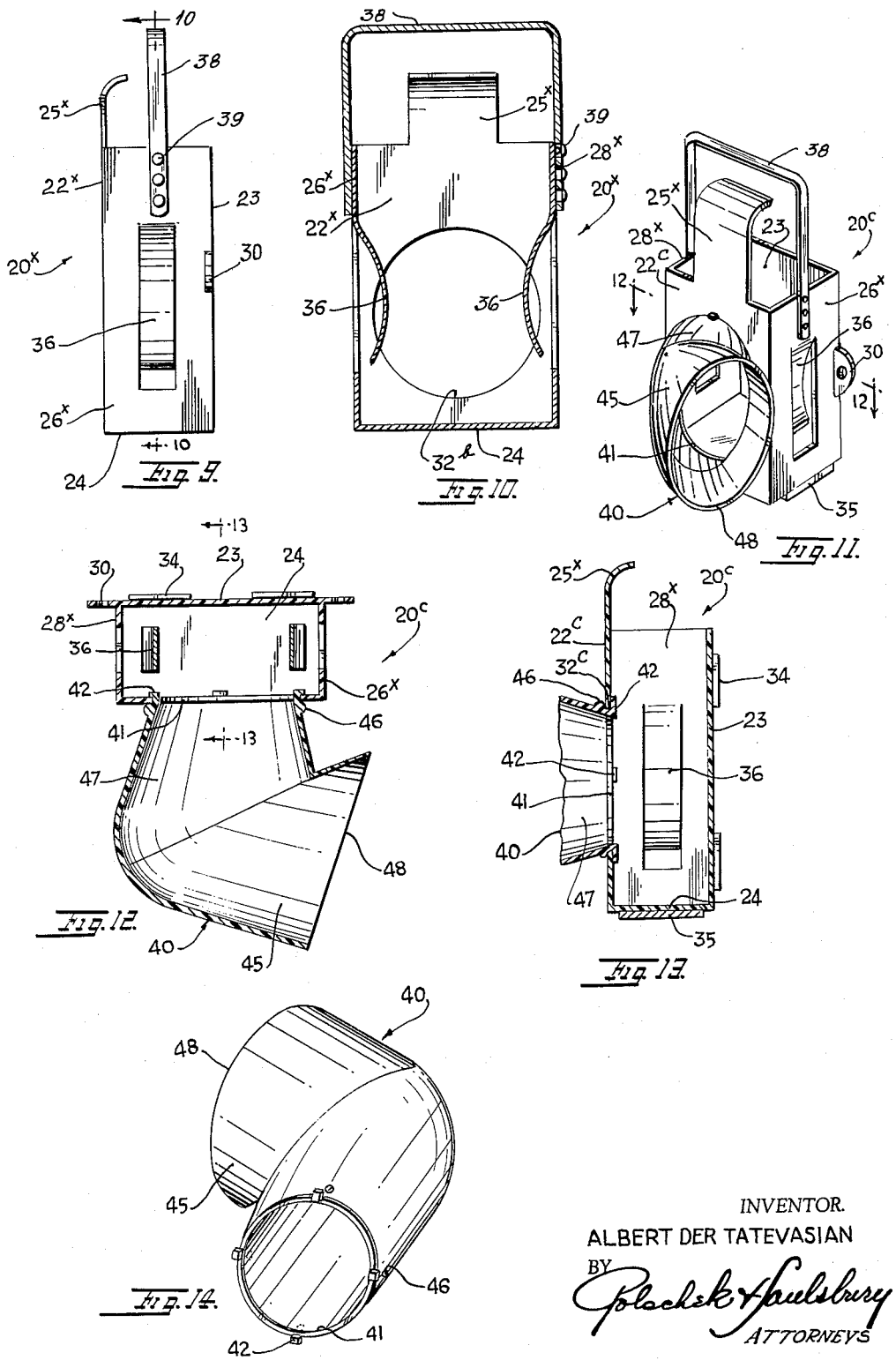

United States Patent Office 3,244,981
Patented Apr. 5, 1966

3,244,981
AUTOMOBILE TRANSISTOR RADIO HOLDER
Albert Der Tatevasian, 99—35 59th Ave., Flushing, N.Y.
Filed June 13, 1963, Ser. No. 287,725
1 Claim. (Cl. 325—361)

This invention concerns a holder for a transistor radio receiver on the dashboard or rear seat of an automobile.

According to the invention the holder is constructed so that the radio receiver in or out of its carrying carrying case can be readily removed from or inserted into the holder. This makes it possible to use the radio receiver outside of the automobile and to use the radio receiver inside the automobile in place of the conventional car radio receiver.

The holder may be made from pressed sheet metal or from plastic molded to required form. The holder includes a generally rectangular box-like structure with a front wall having an opening therein. This opening conforms in size and position to the loudspeaker opening in the transistor radio receiver or in the usual leather case provided for such a small, portable radio receiver. A springy hinged extension is provided on the holder to engage the radio receiver and retain it in the holder. Suitable mounting members are provided for securing the holder to a support. According to a modification, the holder can be provided with magnets for adjustably and detachably mounting the holder on a magnetic support such as a steel automobile dashboard. According to another modification, spring fingers can be provided integral with the holder walls for snugly holding a radio receiver smaller than the holder inside the holder or for holding the radio receiver while inside or outside of its carrying case inside the holder.

It is therefore one object of the invention to provide a holder for a transistor radio receiver mountable on a support in a vehicle.

A further object is to provide a box-like holder for a transistor radio receiver with hinged spring means for retaining the radio receiver in the holder.

Another object is to provide the radio receiver holder with an adjustable, angular horn for amplifying the sound of the radio receiver and for directing the sound in any desired direction.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of a radio receiver holder embodying one form of the invention.

FIG. 2 is an enlarged front elevational view of the holder, showing a radio receiver mounted therein.

FIG. 3 is a vertical sectional view taken on line 3—3 of FIG. 2.

FIG. 4 is a top plan view taken a line 4—4 of FIG. 2, parts being omitted.

FIG. 5 is a perspective view of a radio receiver holder, embodying a modified form of the invention.

FIG. 6 is a rear elevational view of the holder of FIG. 5, on an enlarged scale.

FIG. 7 is a sectional view taken on line 7—7 of FIG. 6.

FIG. 8 is a perspective view of a radio receiver holder embodying another modified form of the invention.

FIG. 9 is a side elevational view of a holder embodying still another modified form of the invention.

FIG. 10 is a sectional view taken on line 10—10 of FIG. 9.

FIG. 11 is a perspective view of a radio receiver holder embodying a still further modified form of the invention.

FIG. 12 is a cross-sectional view taken on line 12—12 of FIG. 11.

FIG. 13 is a vertical sectional view taken on line 13—13 of FIG. 12.

FIG. 14 is a rear perspective view of the horn shown in FIG. 11.

Referring first to FIGS. 1–4, there is shown a radio receiver holder 20 embodying one form of the invention. This holder is a generally rectangular box-like structure with a flat rectangular front wall 22, flat rectangular rear wall 23, flat rectangular bottom wall 24, and rectangular opposed vertical side walls 26, 28. The holder has an open top. The front wall 22 has an upwardly and rearwardly extending flexible extension 25 hinged to the top thereof as indicated at 27. The extension has an upwardly extending flange 29 coacting with a hook portion 31 on the top of an extension 33 on the top of the rear wall 23. The extension 25 serves as a retainer member to engage over the top of a rectangular transistor radio receiver R disposed inside of or out of a carrying case. The box-like radio receiver is indicated by dotted lines in FIGS. 2 and 3. The side walls 26, 28 are shorter than the radio receiver to provide access to volume and tuning controls at the upper sides of the radio receiver.

A pair of apertured eyes 30 are provided at opposite sides of the holder for receiving screws to attach the holder to a vertical support. Alternatively, suitable hooks can be provided on the vertical support such as an automobile dashboard or back of the rear seat of the automobile for engaging the eyes and hanging the holder in a vertical position.

In the front wall 22 is a large round opening 32 which registers with the loudspeaker grill opening L of the radio receiver R to permit free passage of sound from the radio receiver.

It will be noted that the radio receiver can be readily removed from or inserted into the holder. Thus the radio receiver can be used away from the holder as well as when installed in the holder. Free access is provided to the radio receiver controls, and sound is emitted without being muffled when the radio receiver is in the holder. The radio receiver can be disposed inside a carrying case while in the holder.

FIGS. 5–7 show another embodiment of the invention, in which holder 20$^a$ is especially adapted for hanging or standing on vertical or horizontal portions of a steel dashboard of an automobile. The holder 20$^a$ has certain parts corresponding to those of holder 20 and identically numbered. In this form, on the rear side of the rear wall 23$^a$ there is a plurality of small permanent magnets 34 in the form of small rectangular plates. The holder 20$^a$ can be detachably secured to a vertical magnetic steel wall of an automobile dashboard by magnetic attraction of magnets 34 to the vertical wall.

Secured to the underside of bottom wall 24$^a$ there is another rectangular plate magnet 35. This magnet can retain the holder in a vertical position on a horizontal magnetic steel wall of an automobile dashboard. If permanent attachment is desired screws can be inserted into eyes 30$^a$ for securing the holder to the vertical wall. The screws can be inserted into eyes 30$^{aa}$ extending laterally of the side walls at the bottom thereof for permanently attaching the holder to the horizontal wall of the dashboard.

FIG. 8 shows another modified form of radio receiver holder 20$^b$ which is similar to holder 20, except that two flexible spring fingers 36 are integrally formed with the side walls 26$^b$, 28$^b$ and extend inwardly of the holder.

These spring fingers serve to hold radio receivers of different sizes snugly inside the holder. If the interior of the holder is sufficiently large to accommodate the radio receiver while disposed in a carrying case, then the spring fingers will hold the radio receiver snugly when the receiver is removed from the case. The spring fingers will keep the receiver loudspeaker centered in opening 32$^b$.

The modified form of radio receiver holder 20$^x$ shown in FIGS. 9 and 10 differs from the holder 20$^b$ of FIG. 8, in that the extension 33 on the top of the rear wall 23$^x$ is omitted and the extension 25$^x$ on the top of the front wall 22$^x$ is springy and flexible and formed integrally with the front wall. The front wall extension 25$^x$ serves to retain the radio receiver in the box-like structure.

Furthermore, in this form of receiver holder 20$^x$, a bail 38 is secured to the side walls 26$^x$ and 28$^x$ by means of rivets 39, extending above the box-like structure and serving as a handle for carrying the receiver holder 20$^x$ by hand.

FIGS. 11-13 show still another modified form of radio receiver holder 20$^c$ similar to holder 20$^x$. The holder is provided with a horn 40, shown to best advantage in FIG. 14. This horn has a circular narrow end 41 provided with small radio fingers 42 which engage at the inner rim of opening 32$^c$ in front wall 22$^c$. Small knobs or projections 46 are located at the narrow end of the horn and spaced from the fingers 42 distances equal to the thickness of the rim of opening 32$^c$. The horn can be snapped into the opening 32$^c$ and will then be rotatably mounted. The horn has an outer end or section 45 which is axially disposed at an angle to the axis of narrow inner section 47. Thus the plane of the mouth 48 of the horn is angularly disposed to the plane of wall 32$^c$ and horn end 41. When the horn is rotated in opening 32$^c$ the sound emitted therethrough will be directed up, down, right, left or in any other desired direction angularly to the front wall 22$^c$. The horn 40 can be engaged in opening 32$^c$ of any of the holders 20, 20$^a$, 20$^b$, 20$^x$ or 20$^c$, and will be rotatably disposed therein.

The holders 20, 20$^a$, 20$^b$, 20$^x$ and 20$^c$ can be made of metal or plastic material. They can be made by mass production metal or plastic working machinery at low cost. They are light in weight, attractive in appearance, and their utility is readily apparent.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A holder for a rectangular transistor radio receiver, comprising a rectangular substantially enclosed box-like structure of spring metal having flat rectangular front, rear, bottom and opposed side walls, said structure being open at the top, said front wall having a round opening in the center thereof registering with a loudspeaker opening in a radio receiver when in the box-like structure, a plate-like member extending upwardly from the top edge of the front wall centrally thereof and being free from securement to the side walls, a hinge device connecting the bottom end of the plate-like member to the top edge of the front wall, said plate-like member curving into a horizontal portion over the top opening in the structure, an upwardly extending flange on the extremity of the horizontal portion of the front plate-like member for holding said front plate-like member in operative position, and perforated support members extending outwardly of the side walls, said front-plate-like member being swingable outwardly to provide clearance for entrance of a radio receiver into the interior of the structure and being swingable inwardly to serve as a closure wall for the radio receiver when in the structure.

References Cited by the Examiner

UNITED STATES PATENTS

| | | | |
|---|---|---|---|
| 1,080,400 | 12/1913 | Adams | 206—19.5 |
| 2,250,782 | 7/1941 | Tapie | 206—41 |
| 2,447,787 | 8/1948 | Atkinson | 206—38 |
| 2,702,604 | 2/1955 | Hocks et al. | |

DAVID G. REDINBAUGH, *Primary Examiner.*

J. W. CALDWELL, *Assistant Examiner.*